April 1, 1930. W. W. ROWE Re. 17,633
PROCESS OF CRINKLING AND REENFORCING PAPER
Original Filed July 18, 1924
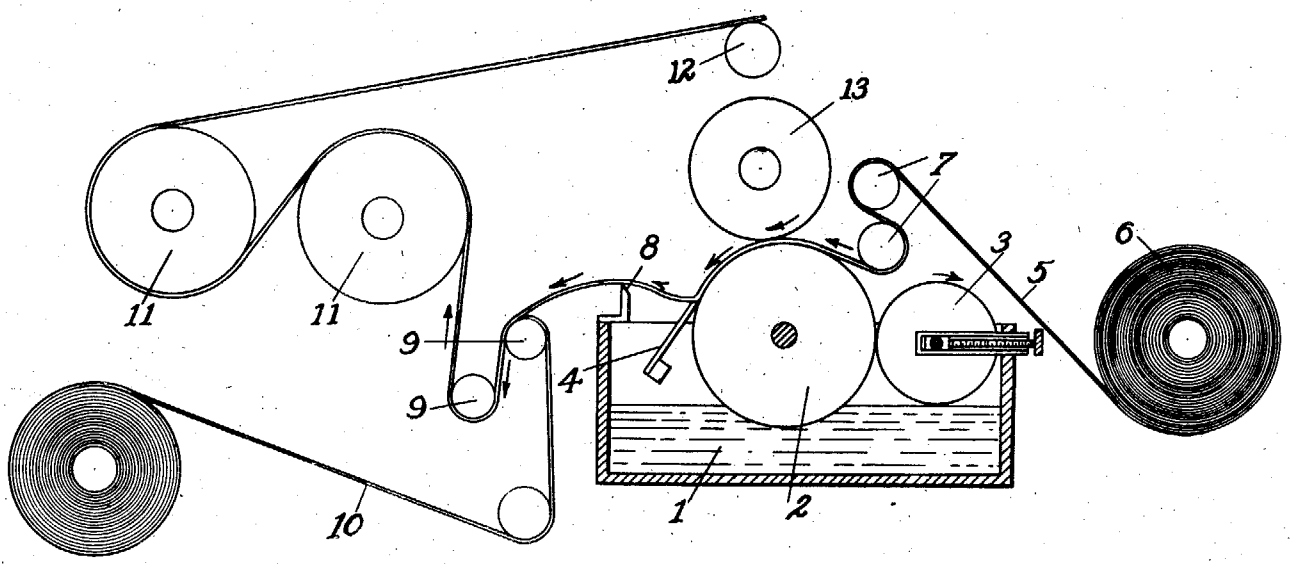
INVENTOR.
William Wallace Rowe
BY Allen & Allen
ATTORNEY.

Reissued Apr. 1, 1930 Re. 17,633

UNITED STATES PATENT OFFICE

WILLIAM WALLACE ROWE, OF CINCINNATI, OHIO, ASSIGNOR TO THE PAPER SERVICE COMPANY, OF CINCINNATI, OHIO, A CORPORATION OF OHIO

PROCESS OF CRINKLING AND REENFORCING PAPER

Original No. 1,628,515, dated May 10, 1927, Serial No. 726,709, filed July 18, 1924. Application for reissue filed February 2, 1929. Serial No. 337,072.

My invention relates to a process of forming a crinkled paper with a surfacing material on one side thereof, which surfacing material when plastic may be employed as a binder for securing a stretchable fibre backing or other form of backing.

In the manufacture of crinkled paper, it has been the practice to wet the paper and pass it between a rubber and a steel roll. This causes the moist sheet to adhere to the steel roll from which it is stripped by a brass knife against the roll thereby crinkling the paper. When it is desired to apply a bituminous coating or some cementing agent or varnish to the paper, as for example in making a crinkled paper sheet backed with burlap, where I ordinarily use asphalt as a binder between the paper and the burlap, it has been the practice to dry the crinkled paper, surface it with asphalt, and then scrape away the excess asphalt in such a way as to avoid flattening out the crinkles in the paper.

The double handling of the paper as has been my practice, together with the care required to avoid pulling or ironing out the crinkles in the paper, has led to my present invention, in which these difficulties are done away with.

Thus it is my object to coat a sheet of dry paper with a cementing agent, such as asphalt, and in the same operation to crinkle the paper. It is also my object, where desired, to unite the crinkled paper while the asphalt is still plastic and adhesive with a body of material which acts as a backing. The crinkled nature of the paper, where the backing has a greater stretch than ordinary paper, is a very valuable feature, since the paper will stretch and not tear, when the backing stretches.

I accomplish my objects by that certain series of steps to be hereinafter more specifically pointed out and claimed.

In the drawing the figure is a diagram of a mechanism such as I have found suitable for use in my process.

In the diagram, the tank 1 is an asphalt tank into which dips a driven roll 2, which is a steel roll, such as is used in making crinkled paper. An adjustable roll 3, revolving in the opposite direction to the roll 2, is adjusted to and from the surface of the roll 2, thereby controlling the depth of the film of asphalt carried over upon it. The roll 13 presses the paper to the surface of the roll 2, causing the paper to adhere to the roll 2, so that it will crepe against the brass scraper 4. The brass scraper 4 rests against the steel roll 2, and lifts the paper away therefrom. The paper is drawn off the scraper 4 at a speed slower than it is piled up against the scraper. The relation of these two speeds governs the amount of stretch put in the paper, that is the stretchability is proportional to the amount of crinkling.

The paper 5 is on a roll 6, whence it passes over rollers 7, which feed it between the asphalting roll 2 and the riding roll 13. The paper becomes surfaced and thus adheres to the roll 2, with the help of pressure from the roll 13. The brass knife or scraper 4 lifts away the paper, and the asphalt film adherent thereto. This action I have found results in a very thorough and excellent crinkling of the paper, and in a complete coating of the paper with asphalt, with asphalt within the tiny folds of the crinkles, and generally covering the back of the sheet.

The paper may then be passed over a scraper 8, to remove any surplus asphalt, and if desired, dried and stored.

Paper crinkled by my process will be found to differ from other crinkled papers in a number of important respects.

Paper caused to adhere to the creping roll by means of a heat-softened heat-plastic substance as an adhesive, crepes with a uniformity hitherto unattainable, and is marked by a practical absence of skips and a velvety appearance which, while capable of considerable variation, is nevertheless characteristic. It is uniformly distinguished by a fineness and uniformity of the crinkles, and a freedom from uncrinkled sections or irregularities in the crepe, even in papers so heavy as to be practically impossible of creping by other processes. These differences, I believe chiefly due to the strong bond obtainable through the use of the heat plastic substance as an adhesive in binding the sheet to the roll, which is novel with me.

In water-creping processes intimate contact is necessary between the sheet and the roll, and I believe that the function of the water, aside from its softening effect upon the fibres, is to seal the sheet to the roll so that atmospheric pressure is effective holding it there. It is well known that skips occur at the edges of the sheet in water-creping. It it also true that skips will occur where there is a chance perforation in the sheet. In my process, however, the sheet is adhesively bound to the roll, and the creping is neither dependent upon absolute contact between the roll and the paper, nor upon a vacuum seal. Further, the coating, depending upon its thickness actually separates the sheet from the roll, and is creped with the sheet.

Other factors may have a secondary effect in producing a novel product, such as the condition of the fibers during the creping. It is to be pointed out that my process permits the production of a creped paper without the use of any water whatever, where desired, so that the crinkling may be done with the fibers in their original dry, firmly knitted, resilient, and sized condition; and in this way I may attain a creped sheet characterized by unusual softness and sheen on the uncoated side, while retaining the other characteristics noted above. My process is characterized first, by the use of a heat plastic substance to bind the paper to the roll, and secondly, by a deformation or rumpling of the fibers while they are substantially dry as distinguished from paper which has absorbed great quantities of water as by being passed through a water bath in an uncoated condition, although a degree of moisture in the paper does not apparently affect those characteristics in the final product which flow from the binding of the sheet to the creping roll by means of a heat plastic adhesive substance. Again, since the heat plastic adhesive substance is applied to my paper before the creping operation, and the creping is done while the coating is plastic, the relationship of the coating thereof in my final product to the creped paper itself will differ from the relationship in a product which has been creped without the use of a heat plastic substance and has subsequently been coated with one. It is possible that the qualities of my product may be affected by the distribution and elasticity or other characteristics of the resident film of heat plastic substance on the surface of the final crepe. When my novel product is joined to a backing substance such as burlap, and burlap repeatedly stretched in opposite directions along the bias, my paper has a tendency to disintegrate at a very large number of points into pieces still adhesively secured to the burlap and with such minute lines of cleavage therebetween that sifting is still virtually prevented; whereas an ordinary crepe paper will disintegrate at a few places with wide lines of cleavage which readily permit sifting.

To use the process above described as one stage in the formation of crinkled paper cemented to a backing sheet, such as burlap, for example, I provide a pair of rolls 9, 9, around which the asphalted web is passed. A web 10, of burlap or other backing is also passed around said rolls, between them and the asphalted paper. This results in adherence of the backing, and the united webs are passed over cooling rolls 11, 11, and thence to a rewinding drum 12, or other point for use or storage.

Having thus described my invention, what I claim as new and desire to secure by Letters Patent is:—

1. That process of creping dry paper, without the use of moisture or adhesive requiring drying, which consists in applying a heat plastic bituminous substance to the paper, bringing said substance to a position of adhesion to a creping roll, so as to bind the paper thereto, and removing the paper with a creping knife so as to crepe the same.

2. That process of creping dry paper, without the use of moisture or adhesive requiring drying, which consists in applying a heat plastic bituminous substance to the paper, bringing said substance to a position of adhesion to a creping roll, so as to bind the paper thereto, and removing the paper with a creping knife so as to crepe the same, said bituminous substance being applied in sufficient quantities to serve later as an adhesive in binding a backing sheet to the creped paper by means of said bituminous substance, while same is in a heat plastic condition.

3. That process of creping dry paper, without the use of moisture or adhesive requiring drying, which consists in applying a heat plastic bituminous substance to the paper, bringing said substance to a position of adhesion to a creping roll, so as to bind the paper thereto, and removing the paper with a creping knife so as to crepe the same, said bituminous substance being applied in sufficient quantities to serve later as an adhesive, and prior to the solidification thereof following the creping, applying a backing sheet to the creped paper, thereby causing it to adhere thereto.

4. A process of treating paper which consists in passing a sheet over a roll under pressure with a bituminous coating agent interposed between the sheet and the roll and stripping the sheet from the roll by a scraper set against the said roll, thereby crinkling the sheet, and then passing the sheet into contact with a backing, whereby the backing is caused to adhere to the crinkled paper.

5. A process of treating paper which consists in passing a sheet of paper between two rolls with a film of bituminous substance of adhesive nature interposed between the paper and one of the rolls, then stripping the paper away from the said roll by means of a scraper set against the roll, and then while the bitumen is still soft and adhesive, bringing the crinkled sheet resulting from the stripping into contact with a backing.

6. That process of creping paper which consists in applying a heat-plastic bituminous substance to the paper, bringing said paper to a position of adhesion to a creping roll, so as to bind the paper thereto by said substance, and removing the paper with a creping knife so as to crepe the same.

7. A process of treating paper which consists in passing a sheet over a roll under pressure with the interposition of a heat plastic bituminous coating agent between the sheet and the roll and stripping the sheet from the roll by a scraper set against the said roll, thereby crinkling the said sheet and then passing the sheet into contact with a body of material, whereby said body of material is caused to adhere to the crinkled paper.

8. A process for producing a crinkled paper product, which comprises binding paper to a creping roll through the action of a heat plastic bituminous substance during the creping operation.

9. A product comprising a crinkled paper coated with a heat plastic bituminous substance uniformly within and without the crinkles and characterized by conjoint creping of the fibers and the heat plastic layer, said heat plastic layer adhesively binding said paper to the creping roll during the creping operation.

10. A product formed of a piece of crinkled paper having a crinkled face completely coated within and without the crinkles with a bituminous substance by being first coated with said substance and then creped conjointly while said substance is plastic.

11. A composite product formed of a piece of crinkled paper having a crinkled face completely coated within and without the crinkles with a bituminous substance by being first coated with said substance and then creped while said substance is plastic, said bituminous substance adhesively securing said crinkled paper to another material forming a composite product.

WILLIAM WALLACE ROWE.